9681X
A. Whitney,
Spark Arrester.
Patented May 23, 1836.
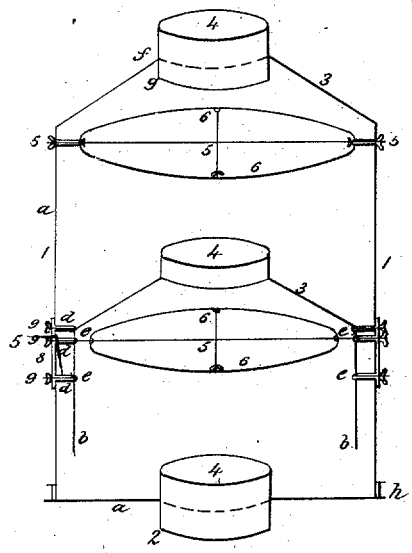
N. PETERS, PHOTO-LITHOGRAPHER, WASHINGTON, D. C.

Abner Whitney Albany N. York

Letters Patent

The Schedule referred to in these Letters Patent and making part of the same containing a description in the words of the said Abner Whitney himself of his improvement in the Spark Extinguisher and Heat condenser ( said Whitney having assigned all his right title and interest in and to the equal half of this Patent to Love S. Burr.

To all to whom these presents shall come. Be it known that I Abner Whitney of the City and County of Albany and State of New York have invented a new and useful spark extinguisher and heat condenser and that the following is a full and exact description thereof. The Spark extinguisher and heat condenser made of any proper material which will withstand fire in the form of a cylinder is [illegible] (see No 1 in diagram A.) firm and substantial at the bottom with an aperture in the middle to receive the pipe of the furnace below (No 2 & 4) at the top (No 3) it is made elliptical and is so formed some thing in fashion of a common funnel) that it may enter if required No 4. a pipe of the same dimension as that placed upon or proceeding from the furnace (No 4.). Immediately below the shoulder No 3. where the ellipse begins is placed two iron bars No 5. which pass from side to side and cross each other at right angles in the centre No 5. Underneath these bars is placed a plate of iron called a damper No 6. This damper must be fastened to the cross iron bars and [illegible] the [illegible] of the cylinder in proportion to the capacity of the pipe of the furnace which must always regulate the bigness of the cylinder. That is if the pipe be ten inches 10 in diameter the cylinder ought to bear about the proportion of thirty inches 30 in diameter that is about 3 to 1. and according to about that proportion if the pipe is larger or smaller. The Damper No 6 placed at the top as above mentioned would agreeable to this proportion require to be about 26 inches in diameter which will leave about in: makes 2. around its periphery through which the smoke will escape. ~~And it is recommended to have the upper damper a little smaller in its dimensions than there will be [illegible] from sparks~~ — Within this cylinder is placed another cylinder (No 7 – 6) of about the same size of the damper above described constructed in the same manner and form as the outer cylinder but made without any bottom. The top [illegible] to be made of the same bigness as the pipe of the furnace and though for most purposes the cylinder may be made stationary, yet in cases where the draft of the furnace shall require to be increased or lessen ed it might be constructed to be raised or let down according to the pleasure of the user by means of slides (No 8.) as herein after mentioned. This cylin- der No 7. should come down so far as to cover the top of the pipe of the furnace within the outer cylinder but leaving a vacuum at the bottom of the cylinder large enough for the operation of the air. and such particles of sediment as may chance to collect. This cylinder is suspended within the other by means of cross bars of iron passing through both cylinders on which is also fixed a damper in the same manner as above described ~~and around the periphery of this damper is an opening~~ within this cylinder which as calculated would equal the capacity of the pipe of the furnace (or a trifle more) The bars No 5. which sup port this inner cylinder and by which this damper is suspended will be seen to pass through both cylinders from side to side and are fas- tened on the outside of the outer cylinder by nut screws on the ends No 9. and on the inside between the two cylinders ought be placed thimbles (d) to keep the inner cylinder in its proper position. and further to assist and support the inner cylinder there ought to be two other screws with heads (e) passing from the inside of the in ner cylinder through the outer cylinder fixed also with nut screws (9 9) upon the outside One above and the other below each end of the bars above mentioned. on these also ought to be placed thimbles (d) to aid in keeping the inner cylinder in its position because it will be found that all the inner machinery will be heated to nearly melting and will become disordered without its properly braced 420 9681X damper to the shoulder No 3 nine inches (9). No 13. from the decompo-
sition of matter within the extinguisher there will collect an oxydated sub
stance in small particles called calx this will fall upon the bottom of the
cylinder and may be removed by a small door (h) upon each side of the
cylinder at the bottom of which may be opened at pleasure whenever this
invention is used in open air - but otherwise if used in water. If the
operator wishes further to condense heat he may rely that he can do it
by adding one or more dampers to the inside of the cylinder and also
add flanges appended from the cylinder above the dampers. But in all
cases likewise introducing a flange or object that may bear any other name
he must take care to preserve the throats or apertures for the smoke to pass
freely. It must not be understood that the cylindrical shape is supposed
to be the only form in which this invention may be made - any other form
that fancy may dictate will be of equal utility if the constructors will
pay attention to the just proportions of the parts that the draft of the smoke
and that the combustible materials may be condensed
may not be obstructed ^ within the cylinder - What I claim as my own
invention and not previously known in the above described machine is the
invention construction apportioning and preparing the whole machine or improve-
ment as is above set forth for the uses and benefits represented in the said above
specifications and to be applied to the pipes of Stove [illegible] to prevent the escape of
sparks of fire and to condense and create heat. Also to the pipe of a Locomotive
car or engine and to Steam Boats for the prevention of sparks. Also if placed
near a furnace where the smelting of ore or smithing requires excess of heat
this machine will be found highly useful In testimony that the above is a true specification of my said improve-
ment as above described I have hereunto set my hand this day
of February 1836.

Witnesses
J.O. Cole
W L Osborn

Abner Whitney

Drawings

Ex'd
ch J W.

(Granted May 23. 1836)